United States Patent
Kunimitsu

(10) Patent No.: US 8,134,314 B2
(45) Date of Patent: Mar. 13, 2012

(54) ELECTRIC POWERED VEHICLE

(75) Inventor: Tomonori Kunimitsu, Kyoto (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 683 days.

(21) Appl. No.: 12/211,346

(22) Filed: Sep. 16, 2008

(65) Prior Publication Data

US 2009/0079369 A1   Mar. 26, 2009

(30) Foreign Application Priority Data

Sep. 20, 2007   (JP) .................................. 2007-244534

(51) Int. Cl.
*H02P 3/18* (2006.01)
(52) U.S. Cl. .......... 318/376; 318/87; 318/362; 318/375; 322/23
(58) Field of Classification Search .................... 318/87, 318/362, 375, 376; 322/23
See application file for complete search history.

(56) References Cited

U.S. PATENT DOCUMENTS

| | | | | |
|---|---|---|---|---|
| 3,720,863 A * | 3/1973 | Ringland et al. | ................. | 318/52 |
| 3,881,141 A * | 4/1975 | Narita | ............... | 318/87 |
| 4,111,274 A | 9/1978 | King et al. | | |
| 5,565,760 A * | 10/1996 | Ball et al. | ......................... | 322/23 |
| 2003/0030410 A1* | 2/2003 | Cochoy et al. | ................ | 318/801 |
| 2008/0077285 A1* | 3/2008 | Kumar et al. | .................... | 701/19 |

FOREIGN PATENT DOCUMENTS

| | | |
|---|---|---|
| EP | 0 994 015 A2 | 4/2000 |
| EP | 1 612 084 A1 | 1/2006 |
| JP | 2001-025101 A | 1/2001 |

* cited by examiner

*Primary Examiner* — Walter Benson
*Assistant Examiner* — Kawing Chan
(74) *Attorney, Agent, or Firm* — Marvin A. Montsenbocker; Mots Law, PLLC

(57) ABSTRACT

An electric powered vehicle according to the present invention comprises a battery, an electric power converting device, an electric motor, a drive wheel, a control part, an accelerator, a brake, and a rotation sensor. The control part detects the velocity using the rotation sensor. When a first velocity threshold is Vt1, and a second velocity threshold is Vt2, and when the thresholds are Vt1<Vt2, regenerative control is permitted in the case where a running velocity increases to or above the second velocity threshold, and the regenerative control is prohibited in the case where the running velocity falls below the first velocity threshold.

4 Claims, 5 Drawing Sheets

ELECTRIC POWERED VEHICLE

The priority application Number 2007-244534, upon which this patent application is based, is hereby incorporated by reference.

BACKGROUND OF THE INVENTION

1. Field of the Invention

The present invention relates to electric powered vehicles performing drive control and regenerative control using an electric motor.

2. Description of Related Art

There has been developed an electric powered vehicle running by transmitting a driving power or braking power generated by an electric motor to wheels. The driving power in such a vehicle is obtained by applying a predetermined voltage to the motor, while the braking power is obtained by using the electric motor as a load. The braking power is obtained, for example by using the electric motor as an electricity generator and converting the kinetic energy of a wheel into the electric energy, thereby imparting a torque in the opposite direction to the rotating direction to the motor (i.e. the torque works as a load). The control for obtaining the braking power using an electric motor as a load in such a manner is hereinafter referred to as regenerative control.

By performing such regenerative control, it is possible to supplement the braking power which cannot be sufficiently obtained mechanically with a conventional drum or disk brake. Also, this has an advantage of being able to retrieve the electric energy by storing the converted electric energy in a battery, as well as being able to supplement the braking power.

The electric powered vehicle with a function of the regenerative control has a usage state in which a user makes the electric powered vehicle run by performing the drive control (hereinafter referred to as "running state"), and a usage state in which a user makes the electric powered vehicle move by pushing it without performing the drive control or braking (hereinafter referred to as "pushed state"). For example, the pushed state is applied in the case where there is a need for moving the electric powered vehicle to a certain place in a parking space.

However, in the pushed state, since the pushing rotates a wheel of the electric powered vehicle, the electric motor connected to the wheel works as a electricity generator (a load), and therefore the regenerative control is performed, whereby the braking power works on the wheel. Thus, the user is subjected to a great load, and in the case where the user does not have enough strength, it is problematic because the electric powered vehicle cannot be moved.

Therefore, for the low velocity movement of the electric powered vehicle when pushed, there has been conventionally proposed a method for prohibiting the regenerative control at or below a predetermined velocity (which is above the pushing velocity, i.e. the velocity with which it is difficult to move the electric powered vehicle by pushing) so that a user who is pushing the electric powered vehicle is not subjected to a great load (See Japanese Patent Laid-Open No.2001-25101).

However, in the electric powered vehicle with the method described above applied thereto, since the regenerative control is prohibited at or below the predetermined velocity, the regenerative control is performed only at the velocity higher than the predetermined velocity. Accordingly, the regenerative control is prohibited even when a user wants to utilize the regenerative control at or below the predetermined velocity (for example, when the running velocity of the electric powered vehicle is decreased, or when a user wants to utilize the braking power by the regenerative control on a sloping road). This can cause a problem of a low regenerative efficiency because the regenerative energy cannot be retrieved at or below the predetermined velocity.

SUMMARY OF THE INVENTION

An object of the present invention is to provide an electric powered vehicle capable of performing regenerative control even when a user wants to utilize the regenerative control at or below a predetermined velocity, and thereby realizing a high regenerative efficiency.

The present invention provides an electric powered vehicle running by performing a drive control for transmitting a driving power obtained when an electric motor works as a driving power source to a wheel, and a regenerative control for transmitting a braking power obtained when the electric motor works as a load to the wheel, wherein when a first velocity threshold is Vt1 and a second velocity threshold is Vt2, and when the thresholds are Vt1<Vt2, the regenerative control is permitted in the case where a running velocity increases to or above the second velocity, and the regenerative control is prohibited in the case where the running velocity falls below the first velocity threshold.

Alternatively, in an electric powered vehicle comprising a wheel for running on a road, an electric motor for transmitting driving power or braking power to the wheel, a control part for performing a drive control for transmitting driving power to the wheel with the electric motor working as a power source and a regenerative control for transmitting braking power to the wheel with the electric motor working as a load, and a velocity detecting part for detecting a running velocity, when a first velocity threshold is Vt1 and a second velocity threshold is Vt2, and when the thresholds are Vt1<Vt2, in the regenerative control, the control part permits the regenerative control in the case where the velocity increases to or above the second velocity threshold Vt2, and thereafter it keeps the permission of the regenerative control until the velocity falls below the first velocity threshold Vt1.

Also, in an electric powered vehicle comprising a wheel for running on a road, an electric motor for transmitting driving power or braking power to the wheel, and a control part for performing a drive control for transmitting driving power to the wheel with the electric motor working as a power source and a regenerative control for transmitting braking power to the wheel with the electric motor working as a load, and a velocity detecting part for detecting a running velocity, when a first velocity threshold is Vt1, a second velocity threshold is Vt2, and a third velocity threshold is Vt3, and when the thresholds are Vt1<Vt2<Vt3, in the regenerative control, the control part permits the regenerative control in the case where the velocity increases to or above the second velocity threshold Vt2, and thereafter in the case where the velocity increases to or above the third velocity threshold Vt3, it keeps the permission of the regenerative control until the velocity falls below the first velocity threshold Vt1.

In the electric powered vehicle described above, in the regenerative control, the control part permits the regenerative control in the case where the velocity increases to or above the second velocity threshold Vt2, and thereafter in the case where the velocity does not increase to or above the third velocity threshold Vt3, it keeps the permission of the regenerative control until the velocity falls below the second velocity threshold Vt2.

In the electric powered vehicle described above, the second velocity threshold Vt2 is 4 km/h or above and below 6 km/h.

In the electric powered vehicle described above, the control part comprises a memorizing part for memorizing a value corresponding to each of the velocity thresholds, and a changing unit for changing at least the value corresponding to the second velocity threshold Vt2 among the values corresponding to the velocity thresholds memorized in the memorizing part.

Since the electric powered vehicle of the present invention has the configurations described above, once the velocity increases to or above a given velocity threshold, the regenerative control is performed even in the case where the velocity is below a predetermined velocity (the second velocity threshold), thereby realizing improvement of the regenerative efficiency.

DETAILED DESCRIPTION OF THE INVENTION

Figure 1:
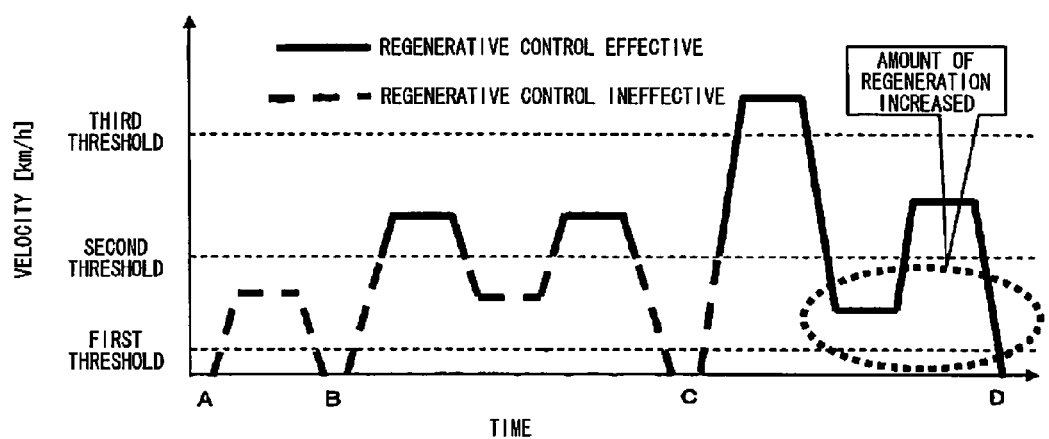
FIG. 1 is a graph showing a velocity transition of an electric powered vehicle and a state of permission and prohibition of regenerative control.

The meaning and effect of the present invention will be clearer in the description of embodiments below. The embodiments are only an example of the present invention, and the meanings of terms of the present invention and each of the components are not limited to the description of the following embodiments.

The present invention is an electric powered vehicle running by transmitting a driving power or braking power generated by an electric motor to a wheel, and controlling the driving power or the braking power, the electric powered vehicle determining a pushed state and a running state to control appropriately to the state. Basic ideas of the present invention are described below.

In the first embodiment of the present invention, a first velocity threshold Vt1, a second threshold velocity Vt2, and a third velocity threshold Vt3 are set so that the velocity thresholds are Vt1<Vt2<Vt3. The electric powered vehicle is determined to be whether in the pushed state or the running state based on the velocity thresholds. Further, when the electric powered vehicle is in the pushed state, it is determined whether the state is an easily pushed state or a difficultly pushed state, whereby regenerative control is permitted or prohibited. The "easily pushed state" and the "difficultly pushed state" are described below.

The "easily pushed state" is a state where it can be determined that the electric powered vehicle is in the pushed state, and the velocity of the electric powered vehicle is low, whereby the electric powered vehicle can be moved by being pushed easily. When the regenerative control is performed in such a state, a user is subjected to a great load because the braking power works as a load when the electric powered vehicle is pushed. Accordingly, when the electric powered vehicle is in the easily pushed state, the regenerative control is prohibited. In particular, the general walking speed of a person is below 4 km/h, and therefore it can be determined that the electric powered vehicle can be moved easily by being pushed when the velocity is below 4 km/h.

The "difficultly pushed state" is a state where it can be determined that the electric powered vehicle is in the pushed state, with the higher velocity of the electric powered vehicle than in the easily pushed state, and it is difficult to lower the velocity due to inertial force of the electric powered vehicle when the electric powered vehicle is moving by being pushed (i.e. the state where it is difficult to move the electric powered vehicle by pushing it). Accordingly, when the electric powered vehicle is in the difficultly pushed state, the regenerative control is performed also in order to lighten the load for the user. In particular, it is determined that the electric powered vehicle is in the difficultly pushed state when the velocity reaches a velocity which is judged to be a fast walking speed (4 km/h or above and below 6 km/h). Thus, even when the velocity is going to increase due to a factor such as a downhill slope, the braking power works on the electric powered vehicle and therefore the velocity increase can be prevented, thereby lightening the load on the user pushing the electric powered vehicle. Also, even when a user is moving the electric powered vehicle by pushing it and the velocity is going to increase too much, for example due to a downhill slope, the braking power works on the electric powered vehicle and therefore the velocity increase can be prevented, whereby the electric powered vehicle can be stopped more easily, and therefore safety is improved.

Next, the "running state" is described. This running state is a state where the drive control is performed to make the electric powered vehicle run as described above. In particular, it can be determined that the electric powered vehicle is in the running state when the electric powered vehicle is moving with a velocity with which a user cannot move the electric powered vehicle by pushing it (for example it is 8 km/h because a jogging speed is 6 km/h or above). Also, in order to shift from the running state to the pushed state, the electric powered vehicle has to be once stopped so that a user gets off the vehicle and then starts pushing the vehicle. Therefore, once the electric powered vehicle is determined to be in the running state, even if the velocity of the electric powered vehicle falls to such a low velocity as in the easily pushed state, it is determined that the electric powered vehicle is still in the running state until the vehicle stops. In the case where the electric powered vehicle is determined to be in the running state, the user is on the vehicle. Therefore, even with such a low velocity as in the easily pushed state, the user will not be subjected to a load. Accordingly, even with such a low velocity as in the easily pushed state, in the running state, the regenerative control is permitted since it is desirable to perform the regenerative control. Thus, in the case where the electric powered vehicle is to be in the running state, the regenerative control is performed to retrieve the regenerative energy, thereby improving the regenerative efficiency.

In particular, from the time when the electric powered vehicle starts to move, the regenerative control is prohibited until the running velocity of the electric powered vehicle increases to or above the second velocity threshold Vt2. And then when the velocity increases to or above the second velocity threshold Vt2, it is determined that the electric powered vehicle is in the difficultly pushed state and the regenerative control is permitted. And then, when the velocity further increases to or above the third velocity threshold Vt3, the electric powered vehicle is determined to be in the running state. Once the electric powered vehicle is determined to be in the running state, even when the velocity falls below the second velocity threshold Vt2, the regenerative control is permitted unless the velocity falls below the first velocity threshold Vt1. And then, when the velocity falls below the first velocity threshold Vt1, it is determined that the electric powered vehicle stops and the state of the electric powered vehicle is shifted from the running state to the easily pushed state, and the regenerative control is prohibited.

FIG. 1 shows a velocity transition of an electric powered vehicle when such control described above is performed and a state of the regenerative control as to whether it is permitted or prohibited. The vertical axis of the graph is for the velocity of the electric powered vehicle and the horizontal axis is for the time. Also, the dashed line shows a state where the regenerative control is prohibited, and the solid line shows a state where the regenerative control is permitted. During the time between A and B, it can be determined that the electric powered vehicle is in the easily pushed state (i.e. there is no duration with the velocity at or above the second velocity threshold), and therefore the regenerative control is prohibited. During the time between B and C, it can be determined that the electric powered vehicle has both a period in the easily pushed state and a period in the difficultly pushed state (i.e. there is some duration with the velocity at or above the second velocity threshold), and therefore the regenerative control is permitted during the period with the velocity being at or above the second velocity threshold Vt2, and is prohibited during the period with the velocity being below the second velocity threshold Vt2. During the time between C and D, the velocity once increases to or above the third velocity threshold Vt3, whereby the electric powered vehicle is determined to be in the running state. In such a case, the regenerative control is permitted from the time when the velocity increases to or above the second velocity threshold Vt2 to the time when it is determined that the electric powered vehicle stops and is again shifted to the easily pushed state (i.e. even when the velocity falls below the second velocity threshold Vt2, the regenerative control is still permitted, and is prohibited when the velocity falls below the first velocity threshold Vt1).

Each of the velocity thresholds is described below. The first velocity threshold Vt1 is used as a threshold for determining that the electric powered vehicle is shifted from the running state to the easily pushed state. When the electric powered vehicle is shifted from the running state to the easily pushed state, a user stops the electric powered vehicle before the user starts walking, and therefore, the velocity is thought to decrease extremely. Accordingly, it is desirable to set the first threshold to a velocity well below the usual walking speed for a person (for example, 2 to 4 km/h), for example, 1 km/h.

The second velocity threshold Vt2 is used as a threshold for determining that the electric powered vehicle is shifted from the easily pushed state to the difficultly pushed state (i.e. a velocity threshold with which it can be determined that it is difficult to move the electric powered vehicle by pushing it). In particular, even when the velocity is a walking speed, in the case where the velocity can be determined to be a fast walking speed, it is difficult to lower the velocity of the electric powered vehicle due to its inertial force. Therefore, it is desirable to set the second velocity threshold Vt2 to 4 km/h or above and below 6 km/h, which is the velocity which can be determined to be a fast walking speed of a person.

The third velocity threshold Vt3 is used to determine that the motor of the electric powered vehicle is under drive control and the vehicle is in the running state. Therefore, it is desirable to set the third threshold to a velocity with which a user cannot move the electric powered vehicle by pushing it. In particular, a jogging speed is said to be 6 km/h or above, and therefore, for example the third velocity threshold Vt3 can be set to 8 km/h with a margin.

Thus, when the velocity of the electric powered vehicle is as low as in the easily pushed state, the regenerative control is prohibited, thereby enabling a user to move the electric powered vehicle without the braking power of the braking control working when the user is moving the vehicle by pushing it. Also, when the velocity of the electric powered vehicle is increased to such velocity as in the difficultly pushed state, the braking power works on the electric powered vehicle while the vehicle is moving by being pushed, whereby the vehicle can be stopped easily, and therefore safety is improved. When the electric powered vehicle is to be in the running state, the regenerative control is permitted even in the case where the velocity of the electric powered vehicle is as low as in the easily pushed state, thereby enabling the electric powered vehicle to retrieve the regenerative energy during running, thereby realizing high regenerative efficiency.

In the second embodiment of the present invention, the regenerative control of the first embodiment described above is performed using only the first velocity threshold Vt1 and the second velocity threshold Vt2, without the third velocity threshold Vt3. In particular, when the velocity increases to or above the second velocity threshold Vt2 (the regenerative control is prohibited before the velocity increases to or above the second velocity threshold Vt2), the electric powered vehicle is determined to be in the difficultly pushed state, and the regenerative control is permitted. After that, even when the velocity falls below the second velocity threshold Vt2, the regenerative control is still permitted. And then, when the velocity further falls below the first velocity threshold Vt1, it is determined that the electric powered vehicle stops and the state thereof is shifted from the running state to the easily pushed state, and the regenerative control is prohibited.

Thus, in the same manner as described above, when the velocity of the electric powered vehicle is as low as in the easily pushed state, the regenerative control is prohibited, and therefore a user can move the electric powered vehicle without the braking power working when the user moves the vehicle by pushing it. Further, once the electric powered vehicle enters the difficultly pushed state, the braking power works until the electric powered vehicle stops (i.e. it is determined that the regenerative control is desired even when the velocity is below a predetermined threshold), whereby the electric powered vehicle can be stopped safely even when the velocity suddenly increases due to a slope or the like. Still further, in the case where the velocity of the electric powered vehicle increases to the velocity with which the electric powered vehicle is determined to be in the running state with the motor of the electric powered vehicle being under the drive control, once the electric powered vehicle enters the difficultly pushed state, the braking power works until the electric powered vehicle almost stops. Therefore, the electric powered vehicle can retrieve the regenerative energy, thereby realizing high regenerative efficiency.

Embodiment 1

Figure 2:
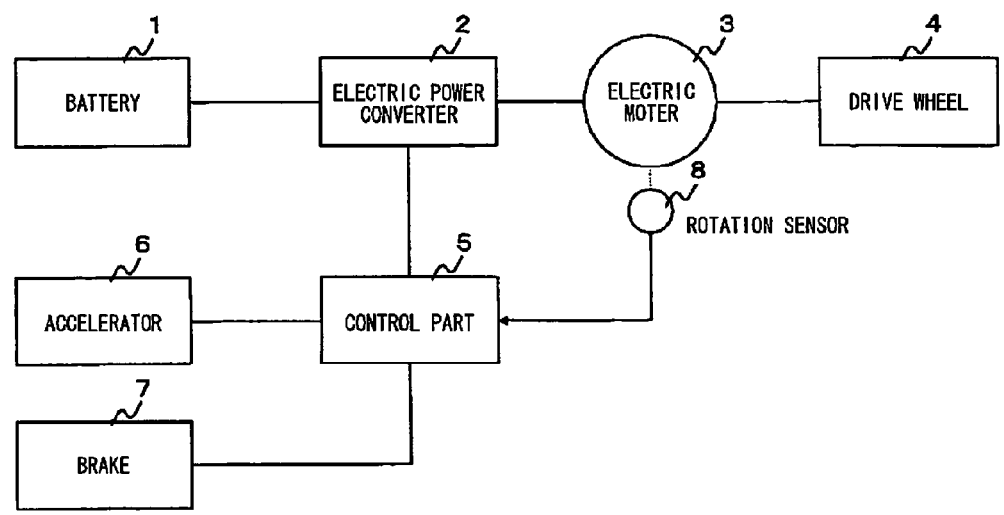
FIG. 2 is a block diagram illustrating a configuration of the electric powered vehicle.

The embodiment 1 of the present invention is described below with reference to the drawings. The electric powered vehicle of the embodiment 1, as illustrated in the configuration diagram of the electric powered vehicle shown in FIG. 2, comprises a battery 1, an electric power converting device 2, an electric motor 3, a drive wheel 4, a control part 5, an accelerator 6, a brake 7, and a rotation sensor 8.

The battery 1 is an electric power source such as a lithium-ion battery, a nickel hydride, a lead storage battery, or a capacitor. The electric power from the battery 1 is converted into the required electric power by the electric power converting device 2 and then supplied to the motor 3. And the electric power generated when the motor 3 performs the regeneration is converted into the required electric power to charge the battery 1. For example, when the motor 3 is an AC motor, an inverter is applied. The motor 3 rotates by being supplied with the electric power converted by the electric power converting device 2, and transmits the rotation to the drive wheel 4.

The accelerator 6 is configured to be operated by rotation of a grip attached to a handle (not shown). The accelerator 6 detects the amount of the rotation from the rotation of the grip, and then transmits the amount of the rotation to the control part 5. The amount of the rotation can be detected by using a sensor for detecting an angle such as a rotary potentiometer. The amount of the rotation of the grip is an accelerator divergence. When the accelerator divergence is zero, it shows that the grip is not rotated from the reference point (i.e. acceleration OFF state), and the greater the accelerator divergence is, the greater the amount of the grip rotation from the reference point it shows (i.e. acceleration ON state). The accelerator divergence transmitted to the control part 5 is used for command torque calculation when the drive control is performed.

The brake 7 is configured, for example, to be operated by a user pulling a handle lever (not shown) provided with the handle. When the brake lever is pulled, a signal is outputted to notify the control part 5 that a braking operation has been conducted. This signal is used when the electric powered vehicle is controlled by the drive control or the brake control of the motor.

The rotation sensor 8 transmits the number of rotations of the motor to the control part 5. The transmitted number of rotations is used for calculating the velocity of the electric powered vehicle.

The control part 5 controls the electric powered vehicle by determining whether performing the drive control, the regenerative control, or no control on the motor 3, on the basis of the accelerator divergence of the accelerator 6 and operation state of the brake 7. The specific way of determination is to be described later. In the case of performing the drive control, the velocity of the electric powered vehicle is calculated from the number of rotations of the motor obtained by the rotation sensor 8. And then a command torque is calculated from the calculated velocity and the accelerator divergence, and the electric power converting device 2 is controlled to provide a torque in accordance with the command torque to perform the drive control on the motor. In the case of performing the regenerative control, the electric power converting device 2 converts the electricity so that the required voltage can be obtained in accordance with the state of charge (SOC) of the battery 1 and the number of rotations of the motor to charge the battery 1. SOC can be obtained by, for example, detecting a voltage by using a detecting part (not shown) for detecting the voltage of the battery. In the case of performing no control, the electric power converting device 2 and the motor 3 are disconnected electrically so that there is no electric power transmission therebetween.

The control part 5 preliminarily memorizes in an internal memory (not shown) a first velocity threshold Vt1, a second velocity threshold Vt2, and a third velocity threshold Vt3, which are Vt1<Vt2<Vt3. These velocity thresholds are used for determining the permission or prohibition of the regenerative control to be described later. When memorizing the velocity threshold, the control part 5 can memorize the velocity itself, but instead a value corresponding to the velocity such as the number of rotations of the motor can be memorized. Also, these values can be changeable as to be described later.

Figure 3:
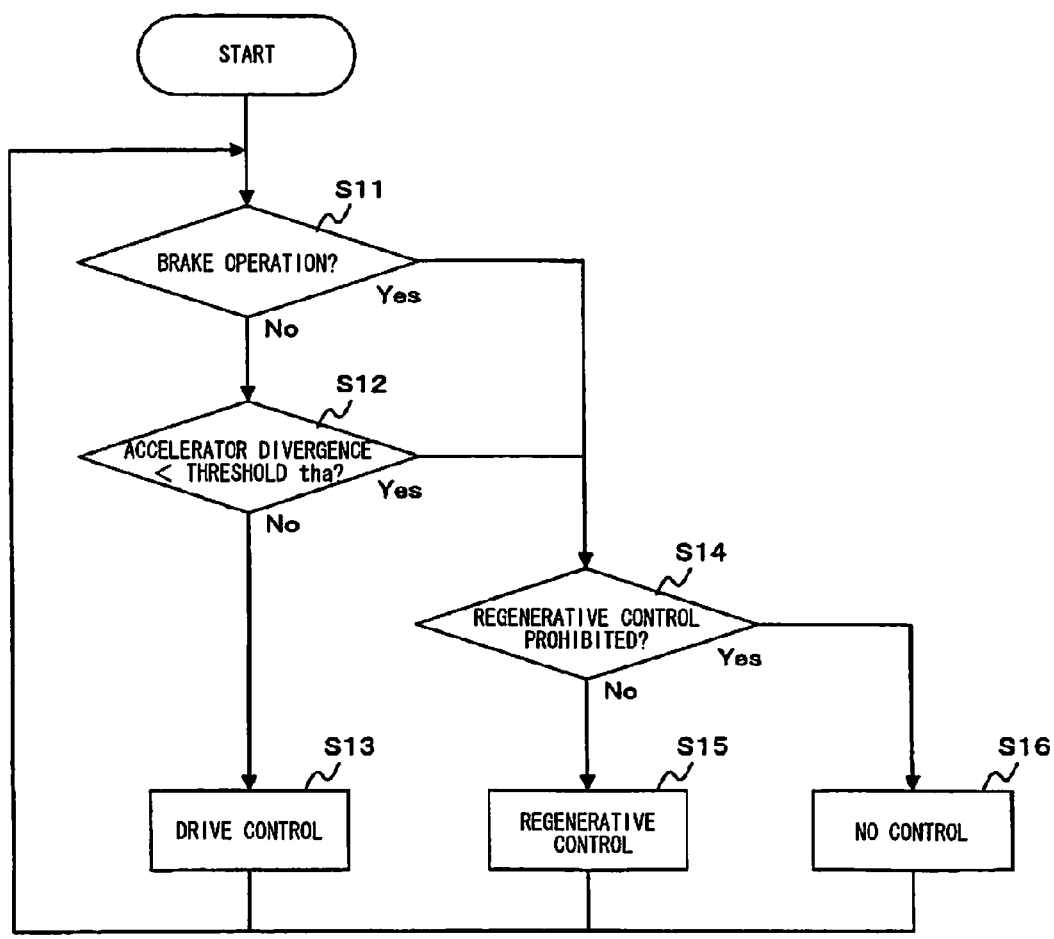
FIG. 3 is a flowchart showing a control process of the electric powered vehicle.

A specific method for controlling the electric powered vehicle is described below. FIG. 3 shows a control process of the electric powered vehicle. The control part determines whether or not a brake operation is conducted in step S11. When it is determined that the brake operation is not conducted, the process proceeds to step S12 and it is determined whether or not the accelerator divergence is smaller than a threshold tha. In other words, the threshold tha is a threshold for determining whether the acceleration is ON or OFF. Therefore, when the accelerator divergence is greater than the threshold tha, the acceleration can be determined to be ON, and when the accelerator divergence is smaller than the threshold tha, the acceleration can be determined to be OFF. When the accelerator divergence is determined to be greater than the threshold tha in this step, the acceleration is ON, and in such a case, the drive control is performed in step S13 and the process returns to step S11.

When it is determined that the brake operation is conducted in step S11, and also that the accelerator divergence is determined to be smaller than the threshold tha (i.e. the acceleration is OFF), it is further determined whether or not the regenerative control is prohibited in step S14. The determination of the permission and prohibition of the regenerative control is to be described later. When the regenerative control is permitted (i.e. determined NO) in step S14, the regenerative control is performed in step S15, and the process returns to step S11. When the regenerative control is prohibited in step S14, the process proceeds to step S16 and no control is performed.

Figure 4:
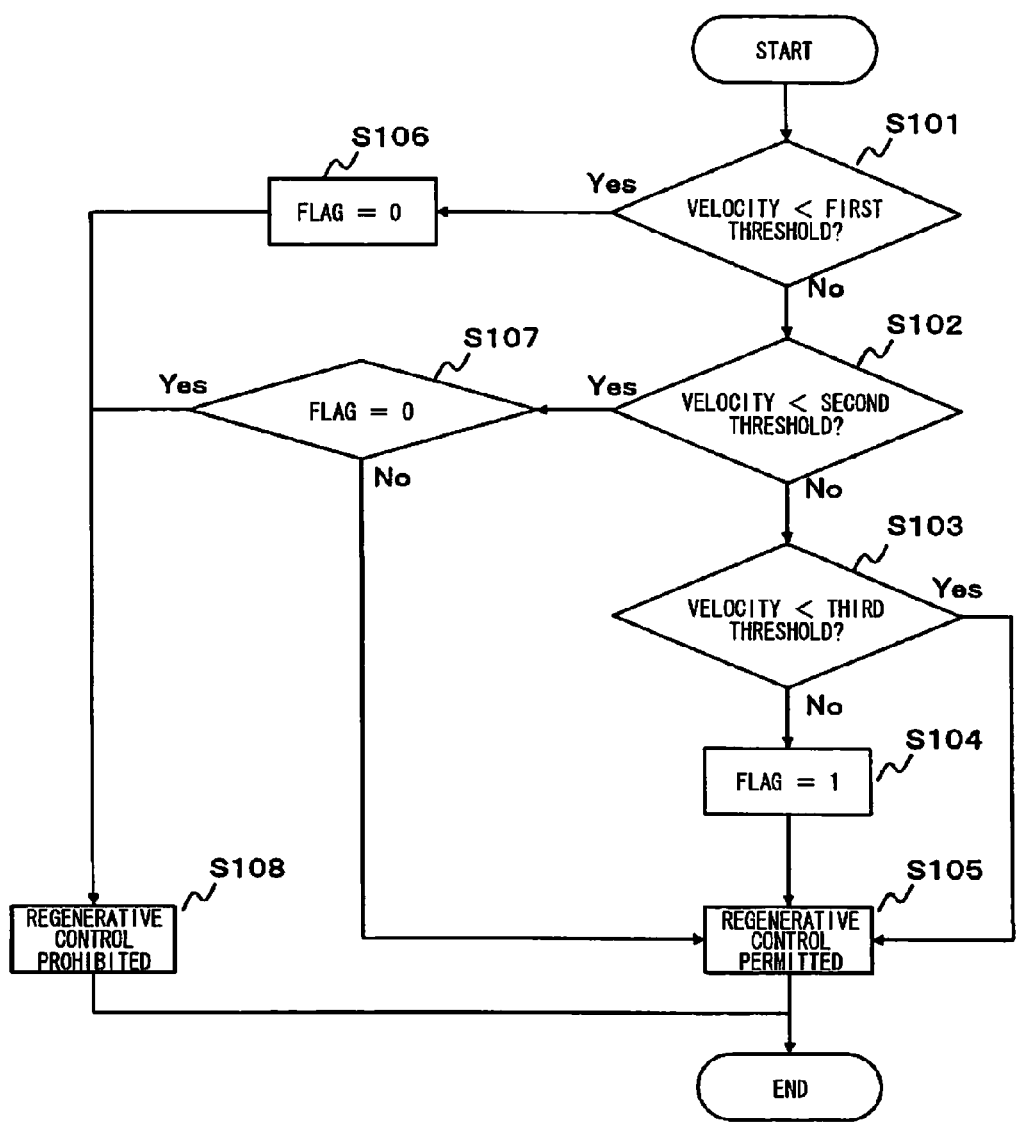
FIG. 4 is a flowchart showing a process of determining permission and prohibition of regenerative control in a first embodiment.

The specific method of determination of permission and prohibition of the regenerative control is described below. FIG. 4 shows a determination process of permission and prohibition of the regenerative control in the embodiment 1. A series of steps from START to END provide a procedure for determination, and this determination process is conducted regularly. Also, this process is conducted in parallel with the control process of the electric powered vehicle shown in FIG. 3, and the results of steps S108 and S105 to be discussed later are used in the determination of step S14 in FIG. 3.

Starting from START, in step S101, the control part 5 calculates the velocity of the electric powered vehicle from the number of rotations obtained by the rotation sensor 8, and determines whether or not the calculated velocity is lower than the first velocity threshold Vt1 (i.e. determination whether or not the electric powered vehicle is in the stopped state). When the velocity is determined to be lower than the first velocity threshold Vt1 (the electric powered vehicle is in the stopped state), a flag is set to zero (S106), and the regenerative control is prohibited (S108), and then the process ends. Here, the flag is for determining whether or not the electric powered vehicle is in a running state. When the flag is zero, it shows that the electric powered vehicle is not in the running state (for example, in the pushed state), and when the flag is one, it shows that the electric powered vehicle is in the running state.

When the velocity is determined to be at or above the first velocity threshold Vt1 (the electric powered vehicle is not in the stopped state) in step S101, the process proceeds to step S102. In step S102, it is determined whether or not the velocity is lower than the second velocity threshold Vt2 (i.e. determination of whether the electric powered vehicle is in the easily pushed state or in the difficultly pushed state) When it is determined that the velocity is lower than the second velocity threshold Vt2 (i.e. the easily pushed state) in step S102, it is determined whether or not the flag is zero in step S107 (i.e. determination of whether or not the electric powered vehicle is in the running state). When it is determined that the flag is zero in step S107 (i.e. not in the running state), the regenerative control is prohibited (S108) and the process ends. When it is determined that the flag is not zero (i.e. in the running state), the regenerative control is permitted (S105), and the process ends.

When it is determined that the velocity is at or above the second velocity threshold Vt2 (i.e. the difficultly pushed state) in step S102, the process proceeds to step S103. In step S103, it is determined whether or not the velocity is lower than the third velocity threshold Vt3 (i.e. determination of whether the electric powered vehicle is in the difficultly pushed state or in the running state). When it is determined that the velocity is lower than the third velocity threshold Vt3 (i.e. difficultly pushed state) in step S103, the regenerative control is permitted (S105) and the process ends. When it is determined that the velocity is at or above the third velocity threshold Vt3 (i.e. the running state), the flag is set to one (S104), the regenerative control is permitted (S105), and then the process ends.

Thus, when the electric powered vehicle runs with a velocity of or above the third velocity threshold Vt3, the electric powered vehicle is determined to be in the running state, and therefore, the regenerative control is performed even when the velocity decreases, thereby increasing the regenerative efficiency. Further, when the electric powered vehicle is determined not to be in the running state, the regenerative control is permitted in the case where the velocity increases to or above the second velocity threshold Vt2. Therefore, in the case where the velocity of the electric powered vehicle increases due to a factor such as a downhill, the load can be lightened for a user pushing the electric powered vehicle, and in the case where the velocity of the electric powered vehicle increases too much, the electric powered vehicle can be stopped easily. And such behaviors increase safety. Also, when the electric powered vehicle is determined to be in the easily pushed state, the regenerative control is not performed, thereby enabling a user to move the vehicle by pushing it without being subjected to a load.

Embodiment 2

The embodiment 2 of the present invention is described below with reference to the drawings. In the embodiment 1, the control is conducted by determining the permission and prohibition of the regenerative control of the electric powered vehicle using the first velocity threshold Vt1 to the third velocity threshold Vt3. However, in the embodiment 2, the control is conducted by determining the permission and prohibition of the regenerative control of the electric powered vehicle without using the third velocity threshold Vt3. Here, the configuration of the electric powered vehicle and the control process of the embodiment 2 are the same as the configuration of the electric powered vehicle (FIG. 2) and the control process (FIG. 3) of the embodiment 1, and therefore the description thereof is omitted.

Figure 5:
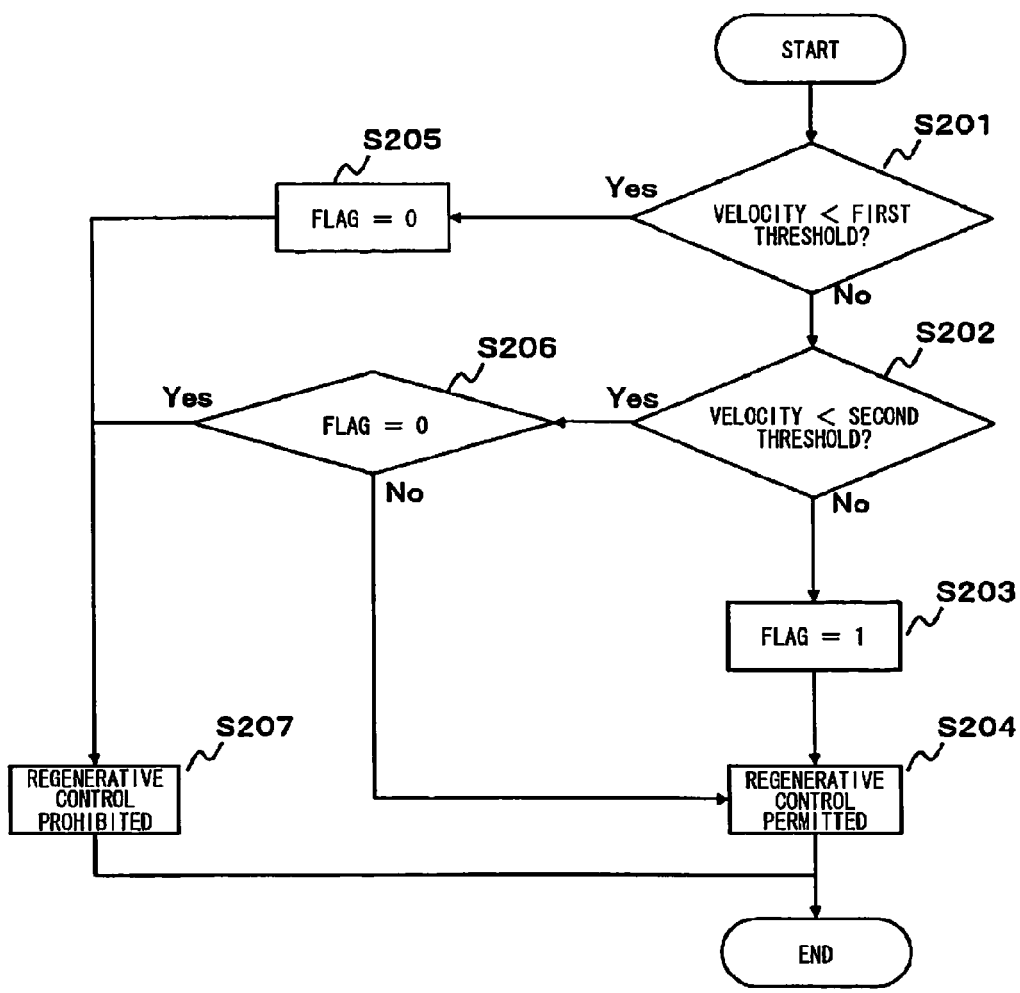
FIG. 5 is a flowchart showing a process of determining permission and prohibition of regenerative control in a second embodiment.

FIG. 5 shows a process of determining the permission and prohibition of the regenerative control in the embodiment 2. Compared to the control process of the embodiment 1 (FIG. 4), this process in the embodiment 2 does not have the determination of step S103.

The specific process of the control process of the embodiment 2 is described below. As well as in the control process of the embodiment 1, in the embodiment 2, a series of steps from START to END provide a procedures for determination, and this determination process is conducted regularly. Also, this process is conducted in parallel with the control process of the electric powered vehicle shown in FIG. 3, and the results of steps S207 and S204 to be discussed later are used in the determination of step S14 in FIG. 3.

Starting from START, in step S201, the control part 5 calculates the velocity of the electric powered vehicle from the number of rotations obtained by the rotation sensor 8, and determines whether or not the calculated velocity is lower than the first velocity threshold Vt1 (i.e. determination whether or not the electric powered vehicle is in the stopped state) When the velocity is determined to be lower than the first velocity threshold Vt1 (i.e. the electric powered vehicle is in the stopped state), a flag is set to zero (S205), and the regenerative control is prohibited (S207), and then the process ends. Here, the flag is for determining whether or not the electric powered vehicle is in the difficultly pushed state. When the flag is zero, it shows that the electric powered vehicle is not in the difficultly pushed state (for example, in the easily pushed state), and when the flag is one, it shows that the electric powered vehicle is in the difficultly pushed state.

When the velocity is determined to be at or above the first velocity threshold Vt1 (i.e. the electric powered vehicle is not in the stopped state) in step S201, the process proceeds to step S202. In step S202, it is determined whether or not the velocity is lower than the second velocity threshold Vt2 (i.e. determination of whether the electric powered vehicle is in the easily pushed state or in the difficultly pushed state). When it is determined that the velocity is lower than the second velocity threshold Vt2 (i.e. the easily pushed state) in step S202, it is determined whether or not the flag is zero in step S206 (i.e. determination of whether or not in the difficultly pushed state). When it is determined that the flag is zero in step S206 (i.e. not in the difficultly pushed state), the regenerative control is permitted (S204) and the process ends.

When it is determined that the velocity is at or above the second velocity threshold Vt2 (i.e. the difficultly pushed state) in step S202, the flag is set to one (S203), and the regenerative control is permitted (S204) and the process ends.

Thus, when the electric powered vehicle is not in the difficultly pushed state, the regenerative control is permitted in the case where the velocity increases to or above the second velocity threshold Vt2. Therefore, in the case where the velocity of the electric powered vehicle increases due to a factor such as a downhill, the load can be lightened for a user pushing the electric powered vehicle, and in the case where the velocity of the electric powered vehicle increases too much, the electric powered vehicle can be stopped easily. And such behaviours increase safety. Further, once the electric powered vehicle is in the difficultly pushed state, the braking power works until the electric powered vehicle stops (in the stopped state), whereby the electric powered vehicle can be stopped safely even when the velocity suddenly increases due to a slope or the like. Still further, when the electric powered vehicle is determined to be in the easily pushed state, the regenerative control is not performed, thereby enabling a user to move the vehicle by pushing it without being subjected to a load. In addition, even when the electric powered vehicle is to be in the running state, in the case where the electric powered vehicle is determined to be in the difficultly pushed state, the regenerative control is permitted and the permission is kept until the electric powered vehicle is actually in the stopped state, thereby increasing the regenerative efficiency.

In the embodiments, the brake operation is described with an example operated with a lever being pulled, which is provided with a handle, but not limited to this example. For example, the brake can be configured to be operated using a pedal. Here, by applying the brake, a signal for transmitting that the brake is applied is outputted to a control part.

Figure 6:
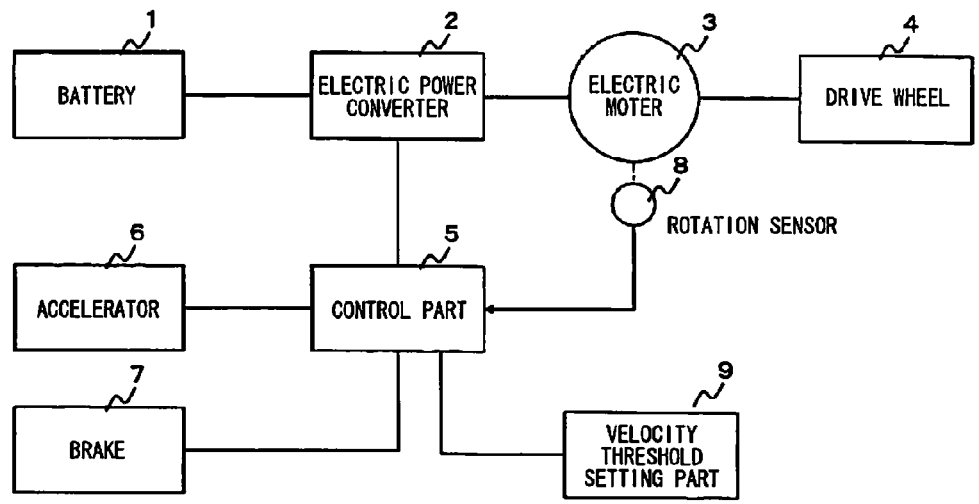
FIG. 6 is a block diagram illustrating another configuration of the electric powered vehicle.
Figure 7:
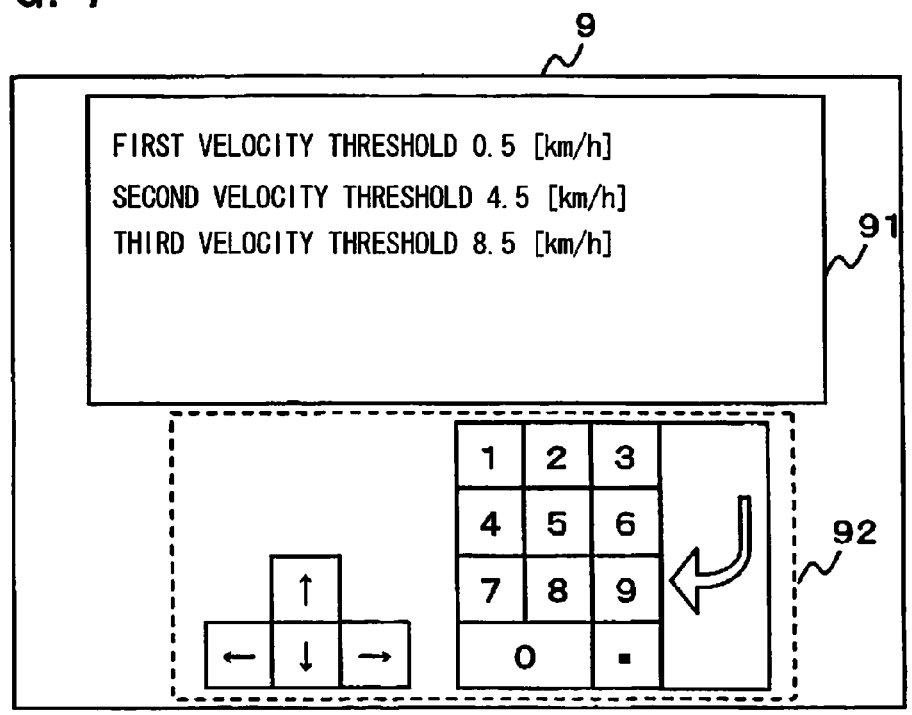
FIG. 7 shows an exemplary velocity threshold setting part.

In the embodiments, the velocity thresholds are preliminarily memorized, but they can be configured so that a user can change the velocity thresholds. In such a case, as shown in a configuration diagram of an exemplary modification of the electric powered vehicle in FIG. 6, a velocity threshold setting part 9 is provided. FIG. 7 shows an example of the velocity threshold setting part. As seen in FIG. 7, the velocity threshold setting part 9 comprises, for example, a display part 91 for displaying a velocity threshold, and a velocity threshold entering part 92 which includes a numerical keypad, an arrow key, and an enter key which are needed for entering the velocity threshold. A user sets the velocity thresholds by entering the velocity thresholds (the first velocity threshold to the third velocity threshold) with the velocity threshold entering part while checking the display part. The velocity threshold setting part 9 can be designed to be stored under a chair or the like usually, and taken out to set a velocity threshold when the setting is needed. Also, the display part can be combined with a trip meter or the like and the display can be switched for setting a velocity threshold when the setting is needed.

Thus, velocity thresholds which vary among individuals can be set on an individual basis. Here, the velocities which vary among individuals can be the walking speed, fast walking speed, and jogging speed, and they are considered in the setting of the first velocity threshold Vt1, the second velocity threshold Vt2, and the third velocity threshold Vt3 respectively. In particular, the second velocity threshold Vt2 is a threshold for obtaining a support by the regenerative control. Therefore, by allowing the second velocity threshold Vt2 to be changeable, the difference among individuals can be absorbed and thereby improving safety.

The embodiments of the present invention are described above. However, the present invention is not limited to the foregoing embodiments in construction but can be modified variously by one skilled in the art without departing from the spirit of the invention as set forth in the appended claims.

What is claimed is:

1. An electric powered vehicle comprising:
   a wheel for running on a road;
   an electric motor for transmitting a driving power or braking power to the wheel;
   a control part for performing a drive control for transmitting the driving power to the wheel with the electric motor working as a power source and a regenerative control for transmitting the braking power to the wheel with the electric motor working as a load; and
   a velocity detecting part for detecting a running velocity,
   wherein when a first velocity threshold is Vt1, a second velocity threshold is Vt2, and a third velocity threshold is Vt3, and when the thresholds are Vt1<Vt2<Vt3, in the regenerative control, the control part permits the regenerative control in the case where the velocity increases to or above the second velocity threshold Vt2, and in the case where the velocity increases to or above the third velocity threshold Vt3, it keeps the permission of the regenerative control until the velocity thereafter falls below the first velocity threshold Vt1.

2. The electric powered vehicle according to claim 1, wherein in the regenerative control, the control part permits the regenerative control in the case where the velocity increases to or above the second velocity threshold Vt2, and in the case where the velocity does not increase to or above the third velocity threshold Vt3 thereafter, it keeps the permission of the regenerative control until the velocity thereafter falls below the second velocity threshold Vt2.

3. The electric powered vehicle according to claim 1, wherein the second velocity threshold Vt2 is 4 km/h or above and below 6 km/h.

4. The electric powered vehicle according to claim 1, wherein the control part memorizes a value corresponding to each of the velocity thresholds, and changes at least the value corresponding to the second velocity threshold Vt2 of the memorized velocity thresholds.

* * * * *